US012693042B2

(12) United States Patent
Poluri et al.

(10) Patent No.: US 12,693,042 B2
(45) Date of Patent: Jul. 28, 2026

(54) CONFIGURATION OF SYSTEMS WITH APPLICATIONS FOR SMALL AND MEDIUM BUILDINGS

(71) Applicant: HONEYWELL INTERNATIONAL INC., Charlotte, NC (US)

(72) Inventors: Nagasree Poluri, Bangalore (IN); Prabhat Ranjan, Bangalore (IN); Gutha Stalin Sanghamitra, Bangalore (IN); Shriram Sankaran, Bangalore (IN); Foong Yeen Chan, Petaling Jaya (MY)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 564 days.

(21) Appl. No.: 18/187,391

(22) Filed: Mar. 21, 2023

(65) Prior Publication Data

US 2023/0304703 A1 Sep. 28, 2023

(30) Foreign Application Priority Data

Mar. 25, 2022 (IN) .............................. 202211017125

(51) Int. Cl.
| | |
|---|---|
| *F24H 15/443* | (2022.01) |
| *G05B 15/02* | (2006.01) |
| *H04L 12/12* | (2006.01) |

(52) U.S. Cl.
CPC ........... *F24H 15/443* (2022.01); *G05B 15/02* (2013.01); *H04L 12/12* (2013.01)

(58) Field of Classification Search
CPC ........ F24H 15/443; G05B 15/02; H04L 12/12
See application file for complete search history.

(56) References Cited

U.S. PATENT DOCUMENTS

| | | | |
|---|---|---|---|
| 6,006,142 | A | 12/1999 | Seem et al. |
| 8,521,332 | B2 | 8/2013 | Tiemann et al. |
| 11,272,011 | B1 | 3/2022 | Laughton et al. |

(Continued)

FOREIGN PATENT DOCUMENTS

EP 3410238 A1 12/2018

OTHER PUBLICATIONS

Zaharoff, Sharon, "Buliding Management System," Mar. 31, 2024, pp. 1-1, XP093072337, Internet retrieved from internet: URL:https://www.techtarget.com/searchdatac enter/definition/building-management-syste m#:~:text=A%20building%20management%20syst em%20(BMS,electromechanical%20services%20i n%20a% 20facility. [retrieved on Aug. 9, 2023] (1 page).

(Continued)

*Primary Examiner* — Michael W Choi
(74) *Attorney, Agent, or Firm* — Seager, Tufte & Wickhem, LLP

(57) ABSTRACT

A system that accommodates such high number of input/output (I/O) terminals of a single big complex application, by splitting the application into smaller, logical fixed applications so that each application can be deployed in one small controller that small and medium buildings can afford. This system also has a feature of an easy and intuitive way of installing, configuring and commissioning these multiple controllers for a single application by abstracting the complexity of entire application/program logic.

20 Claims, 7 Drawing Sheets

(56) References Cited

U.S. PATENT DOCUMENTS

| | | | |
|---|---|---|---|
| 11,287,155 | B2 | 3/2022 | Poluri et al. |
| 11,499,738 | B2 | 11/2022 | Ratakonda et al. |
| 11,687,059 | B2 | 6/2023 | Poluri et al. |
| 2014/0100670 | A1 | 4/2014 | Gosh et al. |
| 2015/0061638 | A1* | 3/2015 | Reh .................. G01R 21/001 |
| | | | 324/76.11 |
| 2017/0082986 | A1 | 3/2017 | Tokuhashi et al. |
| 2021/0080139 | A1 | 3/2021 | Brown et al. |
| 2021/0081099 | A1* | 3/2021 | Uy .................. G06F 3/0488 |
| 2021/0247087 | A1* | 8/2021 | Poluri .................. F24F 11/49 |
| 2021/0397149 | A1 | 12/2021 | Ratakonda et al. |
| 2021/0397160 | A1 | 12/2021 | Poluri et al. |
| 2021/0397763 | A1 | 12/2021 | Gupta et al. |
| 2021/0400033 | A1 | 12/2021 | Gupta et al. |
| 2022/0019184 | A1* | 1/2022 | Kan .................. G05B 15/02 |
| 2024/0045389 | A1* | 2/2024 | Reichl .................. G05B 15/02 |

OTHER PUBLICATIONS

Anonymous: "What are PLC Inputs?", Sep. 27, 2011, pp. 1-3, XP093072385, Retrieved from Internet: RL: https://web.archive.org/web/20110927084310/https://www.plcedge.com/plc-inputs.html [retrieved on Aug. 9, 2023].

Extended European Search Report, European Patent Office, EP Application No. 23163032.8, Nov. 24, 2023 (16 pages).

IN Examination Report, IN Application No. 202211017125, Intellectual Property India, May 14, 2025 (8 pages).

EP Rule 94(3) Communication, EP Application No. 23163032.8, European Patent Office, Nov. 20, 2025 (10 pgs).

* cited by examiner

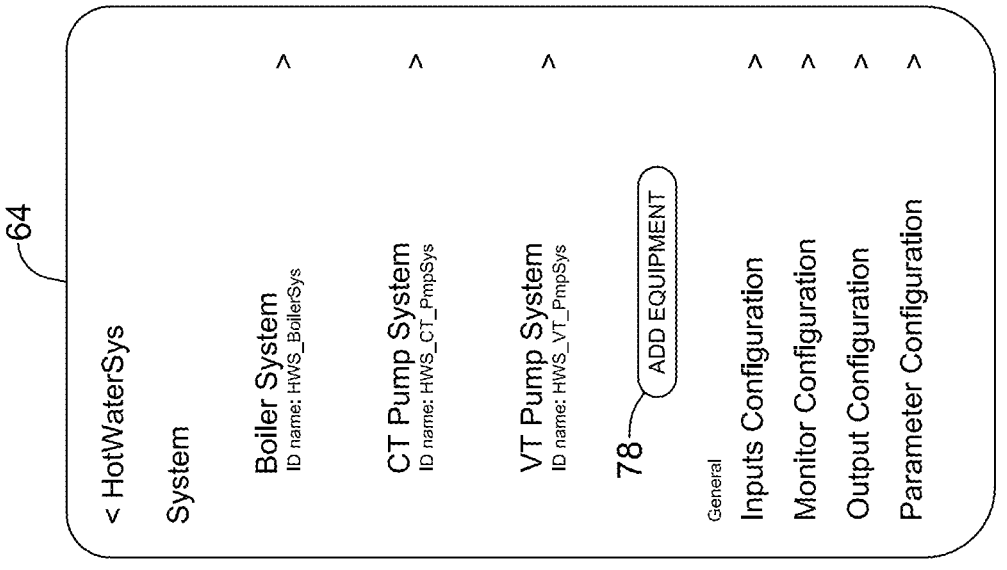

FIG. 6

< HotWaterSys

System

Boiler System
ID name: HWS_BollerSys          ∧

CT Pump System
ID name: HWS_CT_PmpSys          ∧

VT Pump System
ID name: HWS_VT_PmpSys          ∧

78    ( ADD EQUIPMENT )

General

Inputs Configuration          ∧

Monitor Configuration          ∧

Output Configuration          ∧

Parameter Configuration          ∧

64

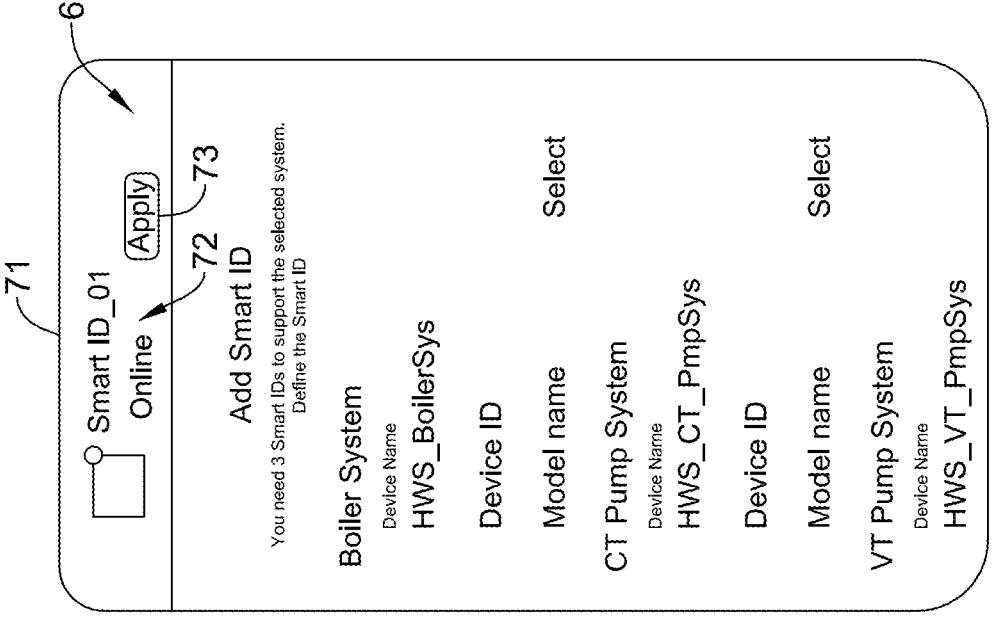

FIG. 5

○ Smart ID_01
Online    ( Apply )

71          72    73

Add Smart ID

You need 3 Smart IDs to support the selected system.
Define the Smart ID

Boiler System
Device Name
HWS_BoilerSys

Device ID

Model name          Select

CT Pump System
Device Name
HWS_CT_PmpSys

Device ID

Model name          Select

VT Pump System
Device Name
HWS_VT_PmpSys

63

CONFIGURATION OF SYSTEMS WITH APPLICATIONS FOR SMALL AND MEDIUM BUILDINGS

CROSS-REFERENCE TO RELATED APPLICATIONS

This application claims priority pursuant to 35 U.S.C. 119(a) Indian Application No. 202211017125, filed on Mar. 25, 2022, which application is incorporated herein by reference in its entirety.

BACKGROUND

The present approach and system pertain to building management systems, especially in small and medium sized buildings (like restaurants, supermarkets, care centers, laboratories, factories, and so forth), maintaining comfort (HVAC, lighting, variable refrigerant flow (VRF), heating and cooling, energy, blinds, security, and so on) with low cost and low manpower is essential. Also, in order to control some of the complex systems like VRF, heating/boiler and cooling, each of these applications need many input/output (IO or I/O) terminals on a building management system (BMS) controller that is controlling these systems.

SUMMARY

In order to accommodate such high number of input/output terminals (e.g., 50 to 60) of a single application, the application needs a plant/supervisory controller with multiple extendable IO modules. Since a plant/supervisory controller and its IO modules are much costlier than the simple controllers needed for small and medium buildings, this solution does not work for this market segment.

Also, understanding a complex application, configuring and installing these applications need trained professionals. This demands a way to split the big complex application into smaller, logical fixed applications so that each application can be deployed in one small controller that small and medium buildings can afford. This also demands a feature an easy and intuitive way of installing, configuring and commissioning these multiple controllers for a single application by abstracting the complexity of entire application/program logic.

BRIEF DESCRIPTION OF THE DRAWING

FIG. 5 and FIG. 6 are diagrams of a hierarchical view of the hot water system.

DESCRIPTION

Figure 1:
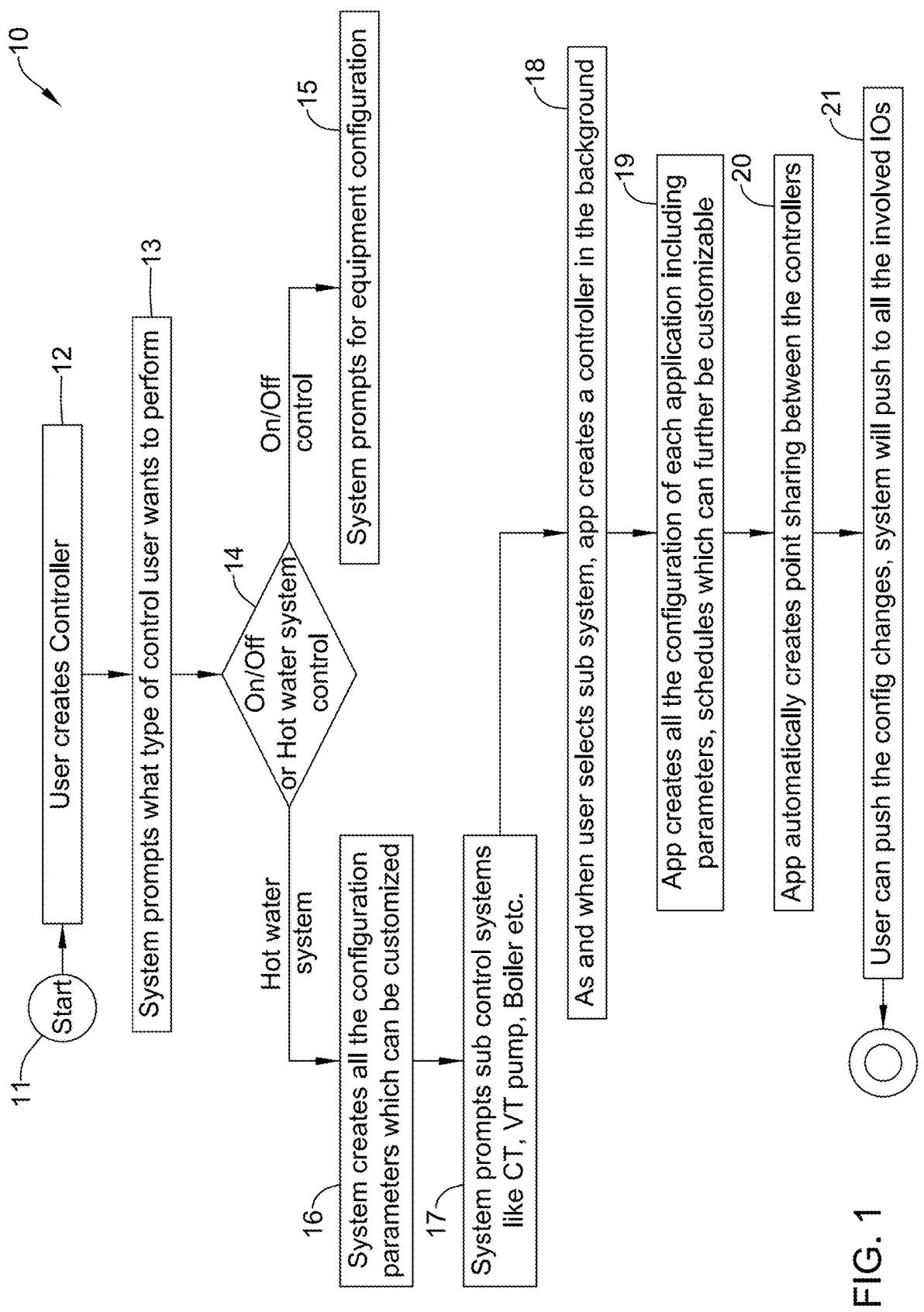
FIG. 1 is a diagram of the present system process.

The present approach is about an intuitive and logical way of splitting a single big complex application into multiple small and fixed applications such that each application can run independently in a low-cost controller with a smaller number of IOs, and configure multiple small controllers that can control a single system for small and medium buildings (SMB) businesses so that any low skilled user can install, configure, and commission a building system with ease using a mobile phone. A small and medium building for examples here may be regarded as having less than fifty thousand square feet of enclosed floor space.

Also, the present approach is a way of logically dividing a complex application such as a hot water system into multiple small and fixed applications such that each application can be run independently by a low-cost controller with a smaller number of IO terminals (e.g., about ten) that small and medium buildings (SaMBa) can afford.

Further, in the present solution, a controller may have a smart IO/wireless IO in that control equipment is going to have a fixed application. The controller may have wired connectivity to physical input/output devices. It may control the physical Input/output devices based on the application/control logic running in the controller. It may be a low-cost controller with a smaller number of IO terminals.

Small and medium buildings may have a need to control heating or cooling systems which are complex in nature. The present applications for small and medium buildings, though complex, are mostly common with minor variations from building to building. Thus, a big complex application may be divided into a number of small and easy and fixed applications with variations exposed as configuration parameters. For example, a heating system in a building often contains a heating general application, constant temperature pump (CT pump) system, a variable temperature pump system (VT pump), a boiler system, a domestic hot water calorifier, and domestic hot water gas calorifier. In order to control this large system, each of the sub systems may be divided as a small, fixed application with configuration parameters exposed that can run in one controller. A calorifier may be an indirect-fired water heater to provide hot water in a heating and hot water system. Indirect fired means that the water heater does not contain a burner. It may be a storage water cylinder with one or more heat exchanger coils which contain a hot liquid.

The customizations of each application may be exposed as configuration parameters. A hot water system may be used as an example in illustrating the present approach. Other kinds of systems such as cooling may utilize the present approach. So, an entire hot water system application may be divided into, e.g., six small applications. First is a heating general application. All the common configurations that are needed for entire hot water system are part of this application. The configurations may include outside air temperature, economizer (ECO) hold off, 1st, 2nd, 3rd stage frost on, and so forth. Second is an application with constant temperature pump system (CT pump) that includes CT duty and standby pump configurations, supply, return temperature, flow status, pump weekly sort, pump auto/manual reset, pump command, pump fail to start alarm, and so on.

Third is an application with a variable temperature pump system (VT pump) that includes VT duty and standby pump configurations, valve configuration, supply, return temperature, flow status, pump weekly sort, pump auto/manual reset, pump command, pump fail to start alarm, and so on. This application may also include a default weekly schedule which can be customized.

Fourth is an application with a boiler system that includes a number of boilers, boiler stages, configuration, outside air temperature, high/low limit setpoints, compensation setpoints, supply, return temperature, boiler command, a boiler weekly sort, boiler demand, and so on.

Fifth is a calorifier application having a valve configuration, supply, return temperature, flow temperature, status, a pump alarm sort, a heater weekly sort, a primary and secondary pump configuration, and so on. This application may also include a default weekly schedule which can be customized.

Sixth is a gas calorifier application with a valve configuration, a supply return temperature, flow temperature, status, a pump alarm sort, heater weekly sort, and a primary and secondary pump configuration. This application may also include default weekly schedule which can be customized.

Each application may be developed in such a way that the necessary/mandatory inputs needed for control operation are designed as physical inputs and any inter-relation between applications is achieved via point sharing. For example, supply temperature and return temperature of a CT pump may be physically wired inputs where as the economizer ECO hold off, 1st, 2nd, 3rd stage frost on status are to be shared from a heating general application to other applications like a CT pump, a boiler system, and so on.

A configuration in a mobile app may be noted. A company connect mobile app may be used to install, configure, and commission the devices of various systems like a hot water system. A mobile app may provide an easy and intuitive way of step-by-step configuration of this entire system. The mobile app may provide a way to add a device/controller (smart IO/wireless I/O) and choose the type of control. A possible option may be an On/Off with monitoring control of a hot water system.

An app may use templates which are a replica of an exact application having parameters with default values, points, schedules, and so on. On a selection of a hot water system, the app may have a template of all of the default configuration/points of a hot water system and create the configurations with default values (inputs, outputs, configuration parameters and displays) to a user. When a hot water system is selected, the app may use templates and create all the input, output, and configuration parameters of a heating general application.

An app may prompt one to select sub control systems of a hot water system. Options may be a CT pump, VT pump, Boiler, Calorifier, Gas Calorifier. A user can further customize any of the input, output, configuration parameter values. The app then may prompt the user to select the sub control systems of the entire hot water system. The options may be a CT pump, VT pump, boiler, calorifier, gas calorifier, and so on. Since many buildings have CT and VT pumps and a boiler mandatorily, the app may select these items by default. A user may choose all of the sub control systems that constitute a hot water system based on their building needs. When a user selects a sub control system, the app may automatically create one smart IO device and give it automatically a meaningful name. For example, if a user selects a CT pump, a VT pump, and a boiler system, then the app may automatically create three smart IOs (as each of these applications needs one IO controller) with a default naming as CT pump, VT pump, and boiler system. Further, a templates app may automatically populate all default input, output, config params, schedules of each of these applications using templates, which then may further be customized. Also, using templates, the app may automatically establish point sharing between these applications/controllers as and when they are created. If a hot water system has all the six sub-systems, it will need six smart IO controllers. Although there are six controllers to be configured, the app may provide an intuitive way so that a user feels that it's a one single hot water system that the user is configuring.

The representation in an app user interface may be also designed in such a way that it shows the hot water system and all its sub control systems as one single view by abstracting the fact that it is being controlled by six different controllers. Once the configuration is complete, the app may have a provision to push the configuration changes to devices. Even in here, once the configuration is complete, the app may push the configuration to its respective smart IO controllers. The app may also have a graphical representation of the entire hot water system. Once this configuration is complete, these data will be synchronized to a cloud and the supervisor application may provide a dashboard to monitor the hot water system by displaying live values of all of the sub control systems.

As and when a user selects a sub control system, the app may create a smart IO controller in the background and add all the default configurations. The app may provide a default name to the controller as per the sub control system. For example, there may be a CT pump which can further be customized.

The app may also create a schedule for each of the applications using templates, and establish point sharing between interrelated applications automatically. For instance, an ECO hold off may be shared from heating general to CT pump, boiler. If the hot water system has all of the six sub-systems, it should need six smart IO controllers. Although there are six controllers to be configured, app provides an intuitive way so that a user feels it is a one single hot water system that the user is configuring.

A representation in an app user interface may also be designed in such a way that it shows the hot water system and all its sub control systems as one single system/view by abstracting the fact that it is being controlled by six different controllers. Also, from this hierarchical view, the app allows the user to configure each sub-system. The app may also provide a graphical representation of entire hot water system. Once the configuration is complete, when user chooses to push the configuration to the controller, the app internally pushes it to all concerned controllers.

In the solution, the controller, a smart IO/wireless IO that may control equipment is going to have a fixed application. The controller may have wired connectivity to physical Input/output devices. The controller may control the physical Input/output devices based on the application/control logic running in the controller. It is a low-cost controller with small number of IO terminals (e.g., about 10).

Small and medium buildings may have a need to control heating or cooling systems which are complex in nature. Applications for small and medium buildings though complex may be mostly common with minor variations from building to building. Thus, a big complex application may be divided into a number of small, easy and fixed applications with variations exposed as configuration parameters. For instance, a heating system in a building typically contains a constant temperature pump (CT pump) system, a variable temperature pump system (VT pump), boiler system, a domestic hot water calorifier, a gas calorifier, and so forth.

A domestic hot water gas calorifier may be noted. In order to control this large system, each of the sub systems may be divided as a small, fixed application with configuration parameters exposed that can run in one controller.

On selection of a hot water system, the app may have a template of all the default configuration/points of the hot water system and create all the configurations with default values (inputs, outputs, configuration parameters) and displays to a user. The user may further customize any of the input, output, and configuration parameter values. Also, the app may then prompt the user to select the sub control systems of this entire hot water system. The options may be a CT pump, VT pump, boiler, calorifier, and gas calorifier. Since many buildings may have CT, VT pumps and boiler mandatorily, the app can also select these by default.

The user may choose all the sub control systems that constitute the hot water system based on the building needs. As and when a user selects a sub control system, the app may automatically create one smart IO device and give it an automatic meaningful name. For instance, if the user selects a CT Pump, VT pump, and a boiler system, the app automatically creates three Smart IOSs (as each of these applications need one IO controller) with default naming as CT pump, VT pump, and boiler system.

Using templates, the app may automatically populate all default input, output, config params, and schedules of each of these applications using templates, which may then further be customized.

Also, using templates, the app may automatically establish point sharing between these applications/controllers as and when they are created. If a hot water system has all of the six noted sub-systems, it will need six smart IO controllers. Although there are six controllers to be configured, the app may provide an intuitive way so that user feels that it's one single hot water system that they are configuring.

The system as a product may target the small and medium building market segment. The product or solution may help in providing greater flexibility by concealing the complexity. It may save lot of training costs as the configuration can be easily done through a mobile phone by any low skilled contractor. It may save overall solution costs as customers do not necessarily need to buy or invest in costly plant controllers. It may reduce manual errors as technicians do not need to deal with the complex programming of BMS controllers. Even small and medium buildings may get the benefits of achieving the same applications as like large enterprise buildings, with cost effective controllers and configuration processes. A seamless process of configuring multiple controllers as a single system may help reduce the cognitive load on users. This approach may be a key differentiator and have a unique selling point (USP) for the SaMBa market which is implemented in the SaMBa deploy mobile app.

The solution may have a software component. Stack level consumption may be domain specific, differentiated software enabled offerings and services delivered via cloud or private enterprise network. Software type may be programming (tools). The software may program a solution for a customer (for instance, it may be software used by an alarm or security company to program an alarm system for customers.) The solution may generate or capture data.

The present system is about dividing a complex hot water system application into multiple logical applications based on the sub-component/system/equipment and its functionality/operation. Also, mandatory inputs are to be physically connected and optional ones are shared across controllers. The system is also about seamless configuration of the hot water system via mobile app as a single system view by abstracting the complexity of multiple controllers per subsystem. The system is about multiple controllers with their respective logics executing in parallel yet operating as one single system.

FIG. 1 is a diagram of the present system process 10. A starting step may begin at symbol 11. A step at symbol 12 may be where a "user creates a controller". The "system prompts what type of control user wants to perform" at symbol 13. A question at symbol 14 asks whether "On/Off or hot water system control" is to be selected. If On/Off control is selected, then the "system prompts for an equipment configuration" at symbol 15.

If a "hot water system control" is selected, then at symbol 16, the "system creates all the configuration parameters which can be customized". Symbol 17 follows where the "system prompts sub control systems like CT, VT pumps, boiler etc."

"As and when user selects sub system, the app creates a controller in the background", according to symbol 18. The "app creates the configurations of each application including parameters, and schedules which can further be customizable" in view of symbol 19. Then, in light of symbol 20, the "app automatically creates point sharing between the controllers". The user can push the config changes, system will push to all the involved "IOs" in view of symbol 21. The process may end at symbol 22.

Figure 2:
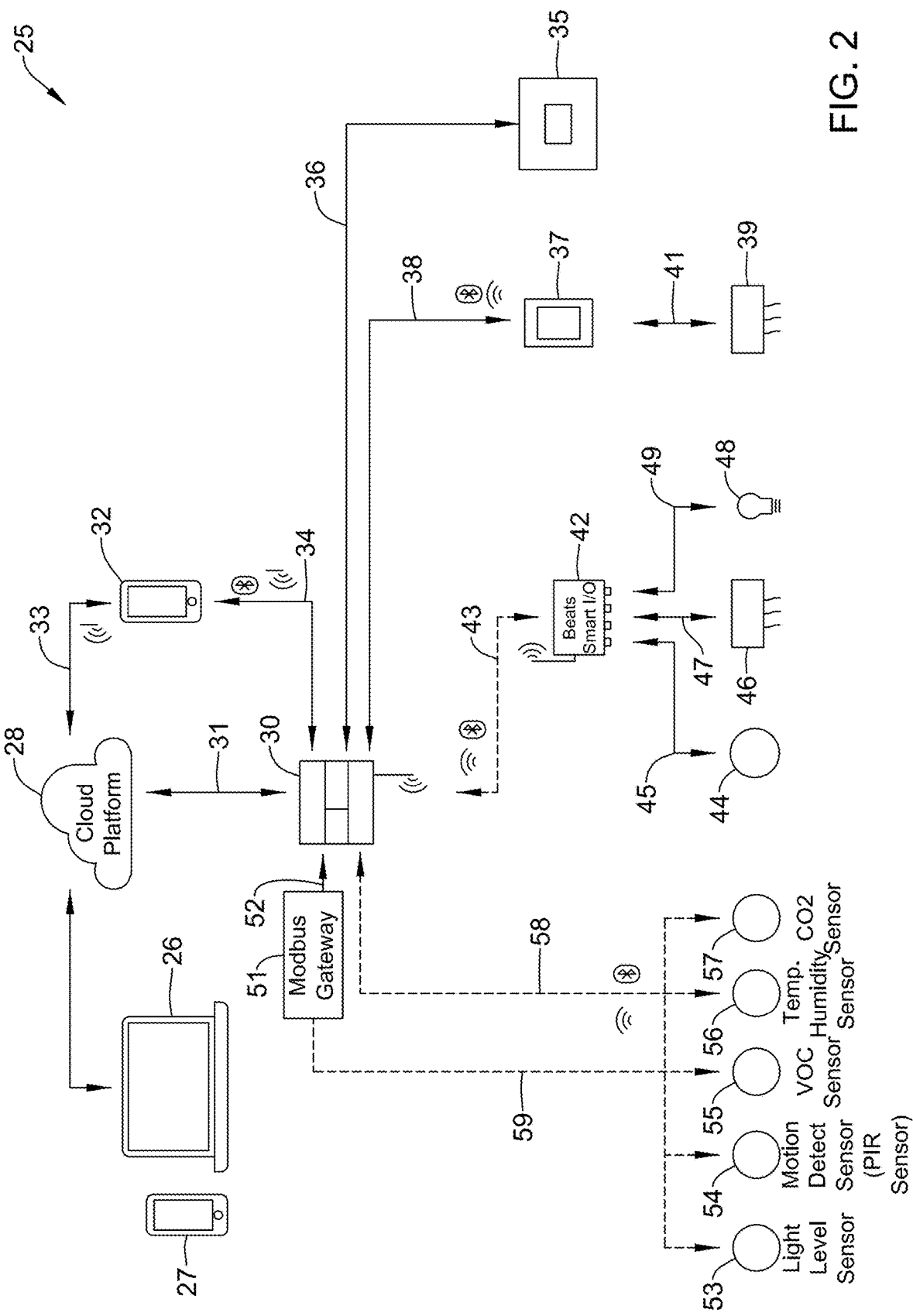
FIG. 2 is a diagram of SAMBA architecture.

FIG. 2 is a diagram of SAMBA architecture 25. A web portal may be shown on a display 26 which is connected to a cloud platform 28. A mobile phone 27 may work a long side of display 26. It may be regarded as a smart view supervise (responsive web app). Cloud platform 28, may be connected to a controller 30 via a 4G/5G Wi-Fi/wired Internet connection 31.

A smart view display (Native app) 32 may have a wireless connection 33 to cloud platform 28 and a wireless connection 34 to controller 30. Incidentally, connections among components in architecture 25 may be wired or wireless. The indicators of wireless (dots) or wire (line) connections are illustrative examples.

An Emon™ meter 35 may have an MSTP/Modbus/M-bus connection 36 to controller 30. An SMB Thermostat 37 may have a wireless connection 38 to controller 30. A roof-top unit (RTU) 39 may have a wire connection 41 to thermostat 37. A gateway beats smart I/O device 42 may have a wireless connection 43 to controller 30. Sensor 44 may have a wire connection 45 to device 42. VRF component 46 may have I/O wire connection 47 to device 42. Lighting 48 may have an I/O wire connection 49 to device 42.

A Modbus gateway 51 may have a wire connection 52 to controller 30. Lighting level sensor 53, motion detect sensor (PIR sensor) 54, VOC sensor 55, temperature humidity sensor 56 and $CO_2$ sensor 57 may each have a wireless connection 58 or 59 to controller 30 or Modbus gateway 51, respectively.

Figures 3, 4:
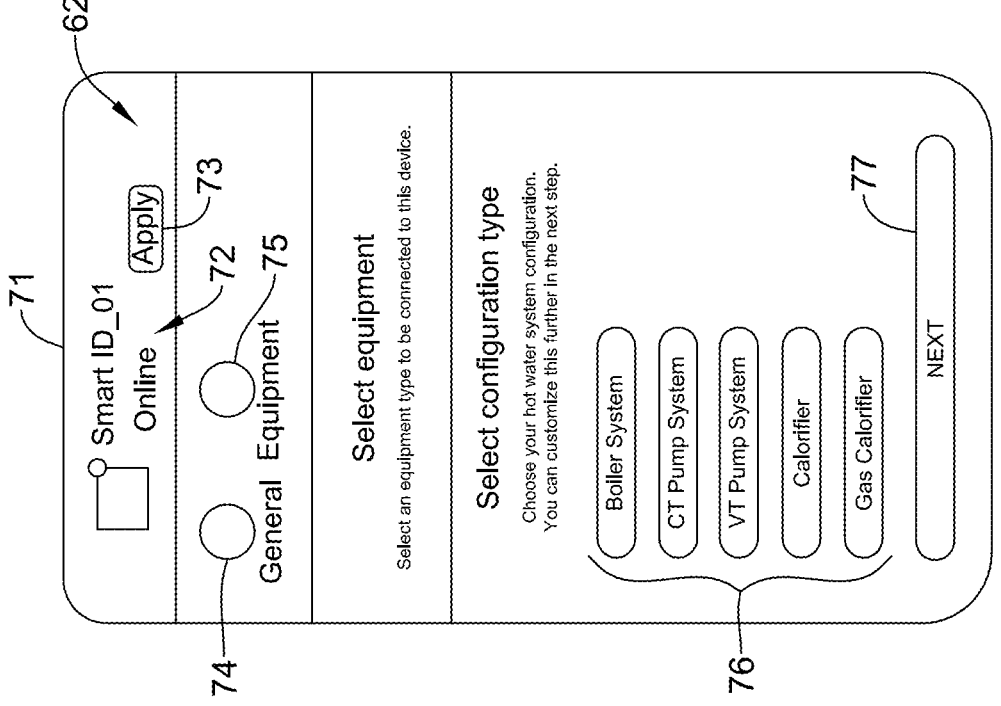
FIG. 3 and FIG. 4 are diagrams of control type options on mobile device displays.

FIG. 3 and FIG. 4 are diagrams of control type options on mobile device displays 61 and 62. Label 71 indicates "Hot Water Sys". It may have an Online button 72 and an apply button 73. There may be a general button 74 and an equipment button 75. One may select a system or equipment for the device. Here one may select a system configuration. There may be a hot water system button or On/Off and monitoring. After creating a controller, the app prompts for a type of control.

Diagram 62 of FIG. 4, title 71 indicates "Smart IO_01". There may be a selection of an equipment type to be connected to this device. The app prompts for sub-systems of a hot water system with default selections which are most important. A choice of selections may include a boiler system, CT pump system, VT pump system, calorifer, and a gas calorifer, as shown in a list 76 in a display. A next button 77 may be pressed to continue.

FIG. 5 and FIG. 6 are diagrams 63 and 64, respectively, of a hierarchical view of the hot water system. According to diagram 63, a smart IO may be added. In the selected system, three smart IOs may be needed. A smart IO may be defined for the boiler system. An app auto may create a number of IOs based on the selection and may show a preview. A CT pump system and VT pump system may be selected. Diagram 64 shows a continuation of the systems which may include the hierarchical view of the hot water system along with its sub-systems. A user may configure each sub-system from this view. In sum, the sub-systems are the boiler system, CT pump system and the VT pump system. To add equipment, a button 78 in diagram 64 may be pressed. In general, an input configuration, a monitor configuration, and output configuration and a parameter configuration are listed in diagram 64.

Figure 8:
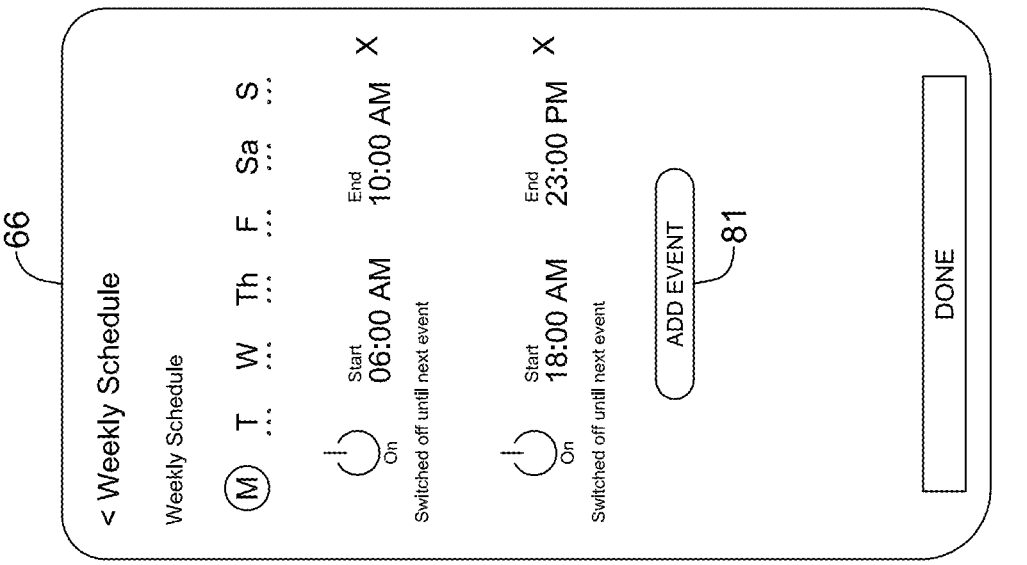
FIG. 7 and FIG. 8 are diagrams that show an auto-creation of each sub-system with its properties.
Figure 7:
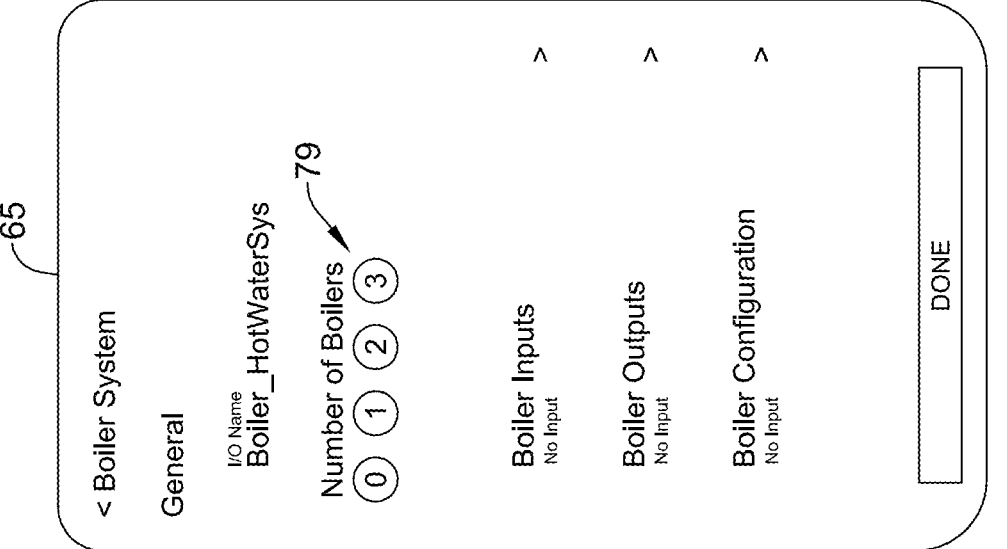

FIG. 7 and FIG. 8 are diagrams 65 and 66, respectively, that show an auto-creation of each sub-system with its properties. An app auto may create all inputs, outputs, config parameters with the most common default values which can be customized for or by a user. A number of boilers is indicated with symbols 79. Also noted is a listing of boiler inputs, boiler outputs and a boiler configuration in diagram 65. In diagram 66, the app auto may create default schedules which can be further customized. The schedules may indicate the weekdays along with start and end times for each event. A button 81 may be pressed to add an event.

Figure 10:
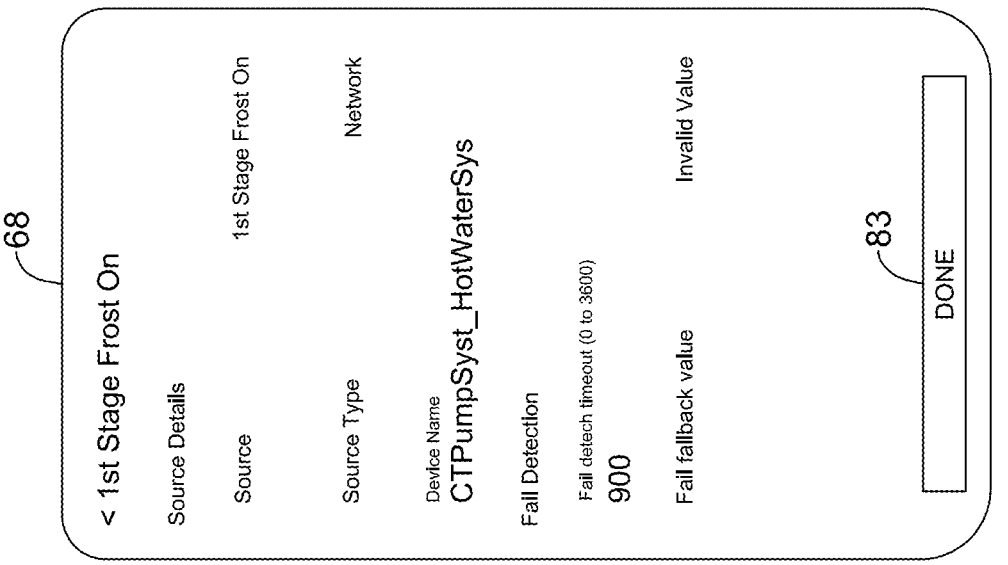
FIG. 9 and FIG. 10 are diagrams that show automatic point sharing between inter-related systems.
Figure 9:
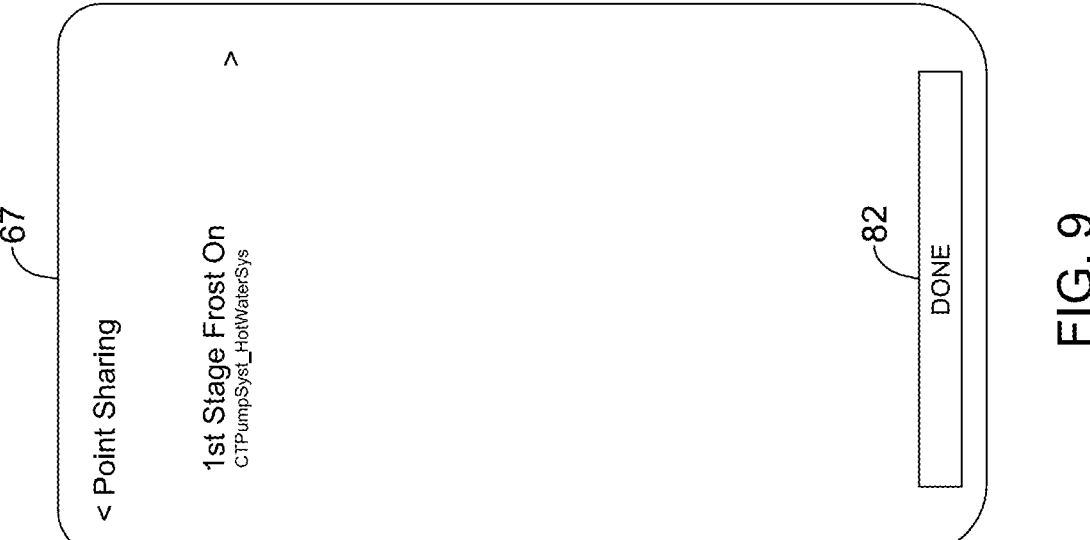

FIG. 9 and FIG. 10 are diagrams 67 and 68, respectively, that show automatic point sharing between inter-related systems. The app auto creates point sharing between inter-related controllers and displays. For example, a first stage frost may be on from heating general to a CT pump as shown in diagram 67. A done button 82 may be pressed to finish items in diagram 67. Source details may indicate first stage frost on as the source, network or a source type and a device name. There may be fail detection with a timeout value. There may be a fail fallback value. Of point sharing properties, there may be fail detect values which can be further customized. A done button 83 in diagram 68 may be pressed to finish items in the diagram.

Figure 11:
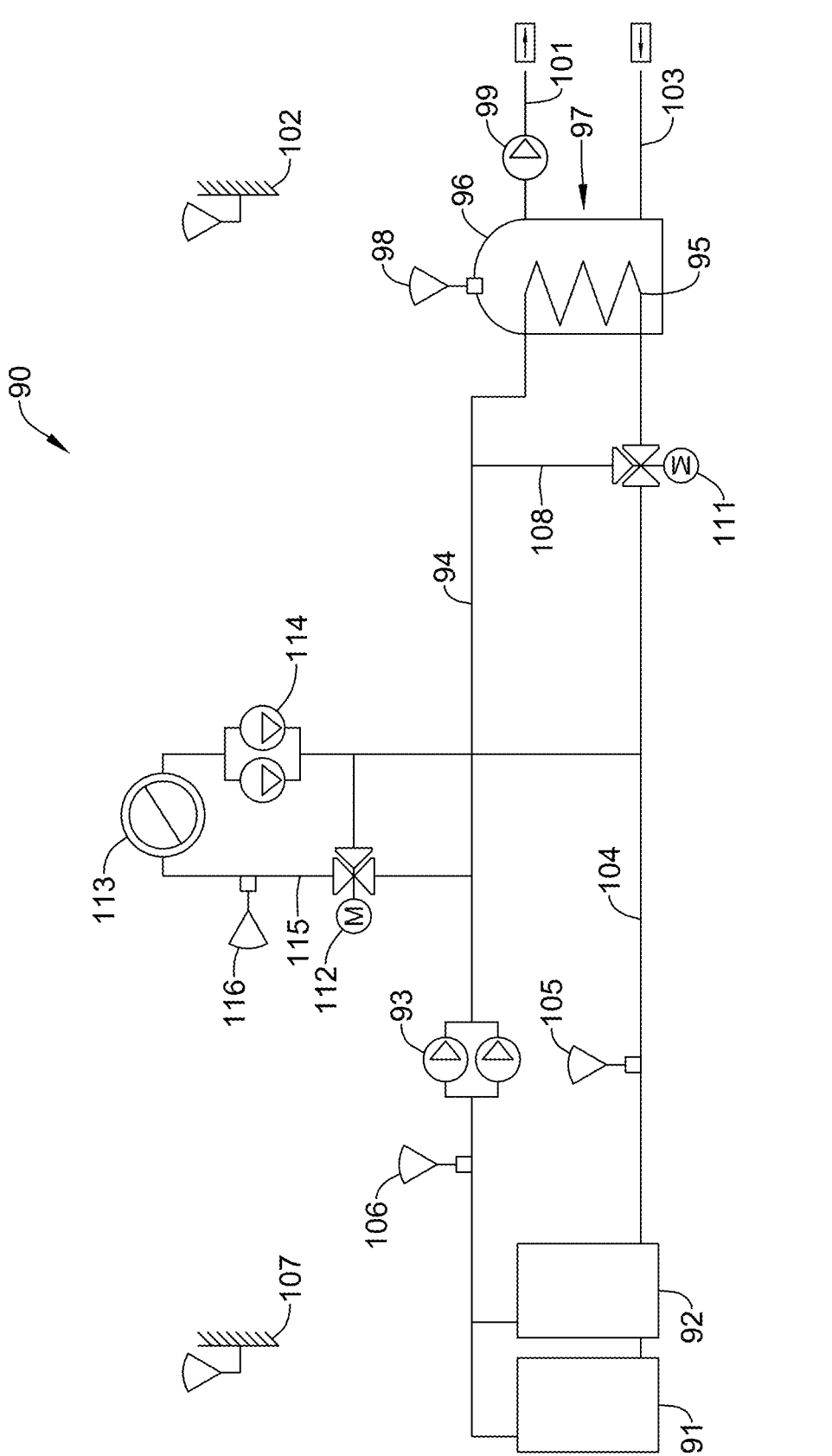
FIG. 11 is a diagram that is a graphical representation of the present system.

FIG. 11 is a diagram 90 that is a graphical representation of the present system. A boiler 91 and boiler 92 may have an output of a fluid being pumped by pump 93 along a pipe 94 through a coil 95, submerged in a tank 96 of water, which constitutes a calorifier 97. Water temperature in tank 96 may be measured by a hot water thermometer 98. Water may be moved out tank 96 by a pump 99 in pipe 101 to an area or room to be heated as indicated by a room thermometer 102. The water in pipe 101 may be returned to tank 96 via a pipe 103.

Fluid of heating element 95 may be returned via a pipe 104 to boilers 91 and 92. A boiler return fluid temperature may be measured in pipe 104 with thermometer 105. Boiler flow temperature in pipe 94 may be measured with the thermometer 106. Outside temperature may be measured with a thermometer 107.

A control valve 111 may be situated on pipe 104 and connected to pipe 94 with a pipe 108. Fluid in pipe 104 may be diverted from pipe 104 to pipe 94 as needed for temperature control purposes. A VT loop 113 has a pump 114 connected to its output and loop 113 has an input connected to a control valve 112 port via a pipe 115. Another port of valve 112 is connected to pipe 94 and still another port connected to the output of pump 114 and to pipe 104. Valve 112 may be adjusted to control temperature of the fluid in pipe 115 according to temperature at sensor 116.

To recap, a building management system may incorporate a large single building management application, and one or more small building management applications divided off from the large single building management application. Each small building management application of the one or more small building management applications may be deployed in a small electronic controller for managing parameters in one or more small buildings. There may be a small electronic controller for each small building management application for managing parameters in the one or more small buildings. The small electronic controller may have a number of physical input/output (I/O) terminals less than a number of physical input/output terminals of a large electronic controller used to run the large single building management application.

The large single building management application may be a technological system.

Each of the one or more small building management applications may be a sub technological system.

The small controller for each small building management application may have fewer than twenty physical input/output terminals.

Each small building may have less than fifty thousand square feet of enclosed floor space.

The technological system may be a hot water system.

Each sub technological system may be an item of a group incorporating a heating general application, a constant temperature pump application, a variable temperature pump application, a boiler application, a non-gas calorifier application, and a gas calorifier application.

One or more small electronic controllers, which run a small building management application, may be installed, configured, and commissioned for managing the parameters in the one or more small buildings with use of a mobile phone.

A seamless configuration of one or more small electronic controllers via a mobile phone may appear as a single system view by abstracting a complexity of a multiple of the one or more small electronic controllers. The multiple of the one or more small electronic controllers with their respective logics may execute in parallel but yet operate as a single system.

Each small building management application as deployed by a small electronic controller may incorporate inputs and outputs for a control operation. Interrelation of physical inputs and outputs between or among applications may be achieved via point sharing.

A structure for a mobile configuration may incorporate a company connect mobile app, and one or more small building management applications split from a large single building management application. Each small building management application of the one or more small building management applications, may be deployed in one small electronic controller to run independently in the small electronic controller. The large single building management application may be deployed in a large electronic controller. The small electronic controller may have a number of physical input/output (I/O) terminals less than a number of physical input/output terminals of the large electronic controller. The company connect mobile app may be used to add, install, configure or commission devices or type of control of the small electronic controller.

The company connect mobile app may incorporate templates. The templates may be a replica of a small building management application having one or more parameters. One or more parameters may be selected from a group comprising default values of points, schedules, and displays. Templates may be used to automatically establish point sharing between or among small building management applications and small electronic controllers when created.

The company connect mobile app may promote a user to select one or more sub control systems of a hot water system. A display of the displays may reveal a graphical representation of the hot water system. One or more sub control systems may be selected from a group incorporating a heating general application, a constant temperature (CT) pump, a variable temperature (VT) pump, boiler, non-gas calorifier and a gas calorifier. The one or more sub control systems may be selected by default.

An approach for installing, configuring and commissioning a building management system using a mobile phone, may incorporate dividing a large complex application into a number of smaller fixed applications with variations exposed as configuration parameters that can run in one electronic controller. Each application may be developed in that the necessary/mandatory inputs needed for control operation are designed as physical inputs and any interrelation between applications is achieved via point sharing.

A company connect mobile app may be used to install, configure, and commission the devices of a plurality of various technological systems. The company connect mobile app may provide a step by step configuration of a hot water system selected from the plurality of various technological systems. The company connect mobile app may provide a way to add a device or electronic controller with a physical smart IO/wireless IO and to choose a type of control.

A representation in an app user interface display may be also designed in such a way in that it shows the hot water system and its sub control systems as a one single view shown on the user interface display by abstracting the fact that it is being controlled by two or more different electronic controllers.

An option may be an on/off with monitoring of the hot water system.

In the selection of the hot water system, an app may have a template of default configurations/points of the hot water system and create configurations with default values including inputs, outputs, configuration parameters and displays.

When the hot water system is selected, the app may use templates and create physical input, output and configuration parameters of a heating general application.

For each sub control system selected, the app may automatically create a number of smart I/Os as each of these applications needs one I/O electronic controller.

U.S. patent application Ser. No. 16/788,183, filed Feb. 11, 2020, is hereby incorporated by reference. U.S. patent application Ser. No. 16/908,437, filed Jun. 22, 2020, is hereby incorporated by reference. U.S. patent application Ser. No. 17/304,268, filed Jun. 17, 2021, is hereby incorporated by reference. U.S. patent application Ser. No. 17/304, 270, filed Jun. 17, 2021, is hereby incorporated by reference. U.S. patent application Ser. No. 17/304,209, filed Jun. 16, 2021, is hereby incorporated by reference. U.S. patent application Ser. No. 17/304,203, filed Jun. 16, 2021, is hereby incorporated by reference. U.S. patent application Ser. No. 14/082,967, filed Nov. 18, 2013, is hereby incorporated by reference. U.S. patent application Ser. No. 13/002,266, filed Jul. 3, 2008, is hereby incorporated by reference. U.S. patent application Ser. No. 08/892,177, filed Jul. 14, 1997, is hereby incorporated by reference.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building management system comprising:
a comprehensive building management software application that is an operational application for controlling building systems; and
one or more specialized building management software applications derived from the comprehensive building management software application by extracting a subset of control functionality from the comprehensive building management software application, wherein each specialized building management software application comprises a subset of functionality of the comprehensive building management software application; and
wherein:
each specialized building management software application is deployed to execute independently in a respective small electronic controller for managing building system parameters; and
each small electronic controller has a number of physical input/output (I/O) terminals less than a number of physical input/output (I/O) terminals of a large electronic controller, and the comprehensive building management software application is deployed in the large electronic controller.

2. The system of claim 1, wherein the comprehensive building management software application comprises application control logic for technological building automation.

3. The system of claim 2, wherein the each of the one or more specialized building management software applications comprise application control logic that controls a specific building system.

4. The system of claim 3, wherein the small electronic controller for each specialized building management software application has fewer than twenty physical input/output terminals.

5. The system of claim 3, wherein each specific building has less than fifty thousand square feet of enclosed floor space.

6. The system of claim 3, wherein the specific building system is a hot water system.

7. The system of claim 6, wherein each building system is selected from the group consisting of: a heating application, a constant temperature pump application, a variable temperature pump application, a boiler application, a non-gas calorifier application, and a gas calorifier application.

8. The system of claim 1, wherein the specialized building management software applications are installed, configured, and commissioned on the one or more small electronic controllers with a mobile software application.

9. The system of claim 8, wherein:
configuration of the one or more small electronic controllers via the mobile software application appears as a single system view by abstracting the complexity of multiple specialized building management software applications executing on the one or more small electronic controllers; and
the multiple specialized building management software applications execute in parallel on their respective small electronic controllers but operate as a coordinated system through data point sharing.

10. The system of claim 1, wherein:

the each specialized building management software application comprises inputs and outputs for control operation execution; and inter-application between specialized building management software applications is achieved via data point sharing.

11. A mobile configuration system, comprising:

a mobile software application; and one or more specialized building management software applications that are derived from a comprehensive building management software application that is an operational application for controlling building systems, wherein the one or more specialized building management software applications are generated by dividing the comprehensive building management software application, wherein each specialized building management software application comprises a subset of functionality of the comprehensive building management software application; and wherein:

each specialized building management software application is deployed to execute independently in one small electronic controller;

the comprehensive building management software application is deployed in a large electronic controller;

each small electronic controller has a number of physical input/output (I/O) terminals less than a number of physical input/output (I/O) terminals of the large electronic controller;

the mobile software application is used to remotely configure and commission the specialized building management software applications on respective small electronic controllers.

12. The mobile configuration system of claim 11, wherein the mobile software application comprises:

software templates; and wherein:

the software templates comprise configurations of specialized building management software applications having one or more configurable parameters;

the one or more configurable parameters include default values of data points, schedules, and displays; and the software templates can be used to automatically establish point sharing between or among small building management applications and small electronic controllers when created.

13. The mobile configuration system of claim 11, wherein:

the mobile software application prompts a user to select one or more sub control systems of a hot water system;

the mobile software application provides a graphical representation of the hot water system;

one or more sub control systems are selected from a group comprising a heating control application, a constant temperature (CT) pump, a variable temperature (VT) pump, boiler, non-gas calorifier and a gas calorifier; and the one or more sub control systems are selected by default.

14. A method for installing, configuring and commissioning a building management system using a mobile phone, comprising:

dividing a comprehensive building management software application that is an operational application for controlling building systems into a plurality of specialized building management software applications by extracting subsets of control functionality from the comprehensive building management software application, wherein each specialized building management software comprises a subset of functionality of the comprehensive building management software application and includes configuration parameters that enable the specialized building management software application to execute on one electronic controller; and wherein each specialized building management software application is developed such that inputs for control operation are designed as physical inputs and inter-application communication is achieved via data point sharing.

15. The method of claim 14, wherein:

a mobile software application is used to install, configure, and commission the software applications of a plurality of various technological systems;

the mobile software application provides a step by step configuration of a hot water system selected from the plurality of various technological systems; and the mobile software application provides a way to add and configure an electronic controller with a smart IO/wireless IO configuration and choose a type of control.

16. The method of claim 15, wherein the mobile software application provides a unified interface display that presents the hot water system and its sub control systems as a single view by abstracting that the hot water system is being controlled by multiple specialized building management software applications executing on respective electronic controllers.

17. The method of claim 16, wherein the mobile software application provides an on/off with monitoring option for the hot water system.

18. The method of claim 15, wherein in the selection of the hot water system, the mobile software application has software templates of default configurations/points of the hot water system and creates configurations with default values including inputs, outputs, configuration parameters and displays.

19. The method of claim 18, wherein when the hot water system is selected, the mobile software application uses the software templates and creates physical input, output and configuration parameters of a heating control application.

20. The method of claim 19, wherein for each sub control system selected, the mobile software application automatically creates smart I/Os as each of these software applications needs one I/O electronic controller.

* * * * *